US011052611B2

(12) United States Patent
Yukumoto (10) Patent No.: US 11,052,611 B2
(45) Date of Patent: Jul. 6, 2021

(54) FABRICATING APPARATUS, FABRICATING METHOD, AND RECORDING MEDIUM THAT PERMITS FABRICATION BASED ON PERMISSIBILITY INFORMATION (71) Applicant: Reiji Yukumoto, Kanagawa (JP)

(72) Inventor: Reiji Yukumoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 7 days.

(21) Appl. No.: 16/299,602

(22) Filed: Mar. 12, 2019

(65) Prior Publication Data
US 2019/0283331 A1 Sep. 19, 2019

(30) Foreign Application Priority Data

Mar. 19, 2018 (JP) .............................. JP2018-051723

(51) Int. Cl.
B29C 64/393 (2017.01)
G06F 3/12 (2006.01)
G06F 9/30 (2018.01)
G06Q 10/06 (2012.01)
G05B 19/4099 (2006.01)
B29C 64/00 (2017.01)
B33Y 10/00 (2015.01)
G05B 19/406 (2006.01)

(52) U.S. Cl.
CPC .......... *B29C 64/393* (2017.08); *B29C 64/00* (2017.08); *G05B 19/4099* (2013.01); *G06F 3/126* (2013.01); *G06F 9/30003* (2013.01); *G06Q 10/06* (2013.01); *B33Y 10/00* (2014.12); *G05B 19/406* (2013.01)

(58) Field of Classification Search
None
See application file for complete search history.

(56) References Cited

U.S. PATENT DOCUMENTS

2014/0288699 A1* 9/2014 Williams ................ B29C 64/25
700/233
2014/0327924 A1 11/2014 Oakley et al.
2014/0371895 A1 12/2014 Sadusk et al.
(Continued)

FOREIGN PATENT DOCUMENTS

JP 2013-067017 4/2013
JP 2013-067018 4/2013
(Continued)

OTHER PUBLICATIONS

Extended European Search Report dated Aug. 29, 2019.

Primary Examiner — Bernard G Lindsay
(74) Attorney, Agent, or Firm — Harness, Dickey & Pierce, P.L.C.

(57) ABSTRACT

A fabricating apparatus includes processing circuitry. The processing circuitry is configured to receive designation of a scheduled fabrication start time of a fabrication object, detect a change in a fabrication practicability condition of the fabricating apparatus, and output change information indicating an occurrence of a change in the fabrication practicability condition of the fabricating apparatus when the change in the fabrication practicability condition has been detected after reception of the designation of the scheduled fabrication start time.

8 Claims, 5 Drawing Sheets (56) References Cited

U.S. PATENT DOCUMENTS

| | | | |
|---|---|---|---|
| 2015/0212512 A1* | 7/2015 | Butler | B23D 59/001 |
| | | | 700/180 |
| 2017/0108843 A1* | 4/2017 | Fukumoto | G05B 19/409 |
| 2017/0123407 A1 | 5/2017 | Shiihara | |
| 2019/0039368 A1* | 2/2019 | Zeng | B29C 64/386 |
| 2020/0047414 A1* | 2/2020 | Kothari | B33Y 50/00 |

FOREIGN PATENT DOCUMENTS

| | | |
|---|---|---|
| JP | 2017-039252 | 2/2017 |
| JP | 2018-114750 | 7/2018 |

* cited by examiner

FABRICATING APPARATUS, FABRICATING METHOD, AND RECORDING MEDIUM THAT PERMITS FABRICATION BASED ON PERMISSIBILITY INFORMATION

CROSS-REFERENCE TO RELATED APPLICATION

This patent application is based on and claims priority pursuant to 35 U.S.C. § 119(a) to Japanese Patent Application No. 2018-051723, filed on Mar. 19, 2018 in the Japan Patent Office, the entire disclosure of which is hereby incorporated by reference herein.

BACKGROUND

Technical Field

Aspects of the present disclosure relate to a fabricating apparatus, a fabricating method, and a recording medium.

Discussion of the Background Art

A three-dimensional (3D) printer is becoming widespread as a device capable of producing fabrication objects without using dies or the like. For example, there are known 3D printers using a method such as a material injection fabrication method (material jet method) in which a support material is removed after the fabrication material and the support material are discharged and cured, a fused filament fabrication (FFF) method, and a selective laser sintering (SLS) method.

There is also proposed a system that reserves a fabrication start time and that automatically starts fabrication processing at a scheduled start time designated by a user.

SUMMARY

In an aspect of the present disclosure, there is provided a fabricating apparatus that includes processing circuitry. The processing circuitry is configured to receive designation of a scheduled fabrication start time of a fabrication object, detect a change in a fabrication practicability condition of the fabricating apparatus, and output change information indicating an occurrence of a change in the fabrication practicability condition of the fabricating apparatus when the change in the fabrication practicability condition has been detected after reception of the designation of the scheduled fabrication start time.

In another aspect of the present disclosure, there is provided a method for fabricating a fabrication object on a fabricating apparatus. The method includes receiving, detecting, and outputting. The receiving receives designation of a scheduled fabrication start time of the fabrication object. The detecting detects a change in a fabrication practicability condition of the fabricating apparatus. The outputting outputs change information indicating an occurrence of a change in the fabrication practicability condition of the fabricating apparatus when the change in the fabrication practicability condition has been detected after reception of the designation of the scheduled fabrication start time.

In another aspect of the present disclosure, there is provided a non-transitory recording medium storing a plurality of instructions which, when executed by one or more processors, causes the processors to execute a method. The method includes receiving, detecting, and outputting. The receiving receives designation of a scheduled fabrication start time of the fabrication object. The detecting detects a change in a fabrication practicability condition of the fabricating apparatus. The outputting outputs change information indicating an occurrence of a change in the fabrication practicability condition of the fabricating apparatus when the change in the fabrication practicability condition has been detected after reception of the designation of the scheduled fabrication start time.

BRIEF DESCRIPTION OF THE DRAWINGS

The aforementioned and other aspects, features, and advantages of the present disclosure would be better understood by reference to the following detailed description when considered in connection with the accompanying drawings, wherein.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Hereinafter, embodiments of a fabricating apparatus will be described in detail with reference to the accompanying drawings. In this specification, the same reference numerals will be attached to the same configurations and functions, and detailed description will be omitted in some cases.

In the present embodiment, a fabricating apparatus to form a fabrication object by the material injection fabrication method (material jet method) will be described as an example. The fabricating apparatus may be any device as long as it is a device for fabricating three-dimensional fabrication objects, and the fabricating method is not limited to the material jet method. For example, the fabricating apparatus may be a fabricating apparatus using the fused filament fabrication (FFF) method, and the selective laser sintering (SLS) method.

Figure 1:
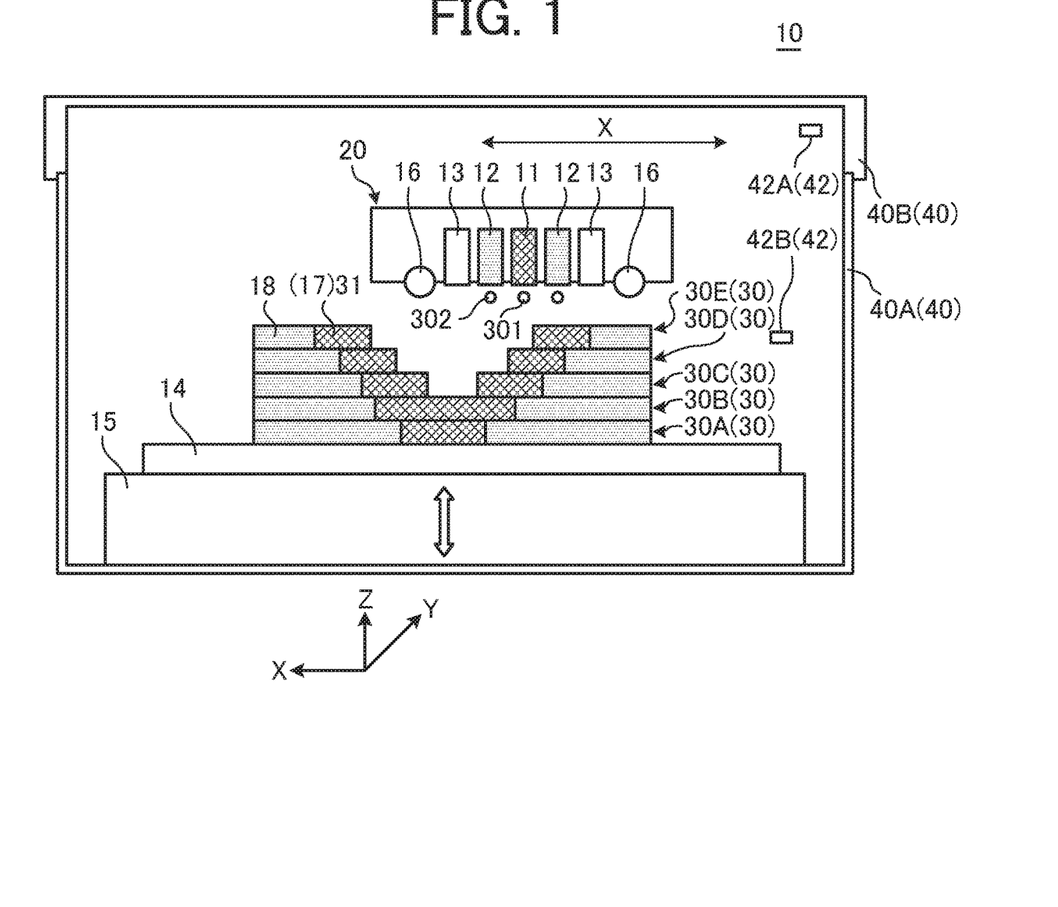
FIG. 1 is a schematic view illustrating an example of a fabricating apparatus.

FIG. 1 is a schematic view illustrating an example of a fabricating apparatus 10 according to the present embodiment.

The fabricating apparatus 10 includes a fabrication stage 14 and a fabricating unit 20. The fabrication stage 14 and the fabricating unit 20 are disposed in a housing 40 of the fabricating apparatus 10. The fabrication stage 14 supports a fabrication object 31 fabricated by the fabricating unit 20.

The fabricating unit 20 stacks fabrication layers 30 on the fabrication stage 14 and fabricates the fabrication object 31 being a stack of the plurality of fabrication layers 30.

The fabricating unit 20 includes a first head 11, a second head 12, the fabrication stage 14, and a flattening roller 16.

The first head 11 discharges a fabrication material. The fabrication material is a material for fabricating the fabrication object 31. In the present embodiment, the fabrication material is a material that is cured by emission of ultraviolet rays.

The second head 12 discharges a support material. The support material is used to support the fabrication layer 30 during fabrication of the fabrication object 31. In the present embodiment, the support material is a material to be cured by emission of the ultraviolet rays. The support portion 18 formed of the support material is finally removed from the fabrication object 31.

The flattening roller 16 flattens the fabrication layer 30.

In the present embodiment, the first head 11 is disposed being sandwiched by two second heads 12 in the X-direction. Note that the X-direction is one axial direction among two mutually orthogonal axial directions constituting a horizontal plane perpendicular to the Z-direction which is a direction along the vertical direction.

In addition, the second head 12, the first head 11, and the second head 12 are disposed being sandwiched by two ultraviolet (UV) irradiators 13 in the X-direction. In addition, the UV irradiator 13, the second head 12, the first head 11, the second head 12, and the UV irradiator 13 are arranged in the X-direction between the two flattening rollers 16.

The fabricating unit 20 is reciprocated in the X-direction and is relatively movable in the Y-direction with respect to the fabrication stage 14. In addition, the fabrication stage 14 is disposed so as to be able to ascend and descend in the Z-direction by a Z-direction elevation device 15.

In the present embodiment, the housing 40 of the fabricating apparatus 10 includes a body 40A and a cover 40B. The cover 40B is provided so as to be openable and closable with respect to the body 40A. The user opens the cover 40B and performs maintenance of individual parts of the apparatus within the housing 40, extraction of the fabrication object 31 fabricated in the housing 40, or the like.

Furthermore, the fabricating apparatus 10 includes one or more sensors 42. The sensor 42 is a sensor to detect conditions inside the housing 40 of the fabricating apparatus 10.

The present embodiment will be described as a case where the fabricating apparatus 10 includes a sensor 42A and a sensor 42B as the sensor 42.

The sensor 42A detects opening and closing of the cover 40B. That is, the sensor 42A detects a state of the cover 40B, that is, whether the cover 40B is open or closed.

The sensor 42B detects a foreign object (for example, a tool mounted during maintenance) other than the fabrication layer 30 (a model portion 17 and the support portion 18) on the fabrication stage 14.

Figure 2:
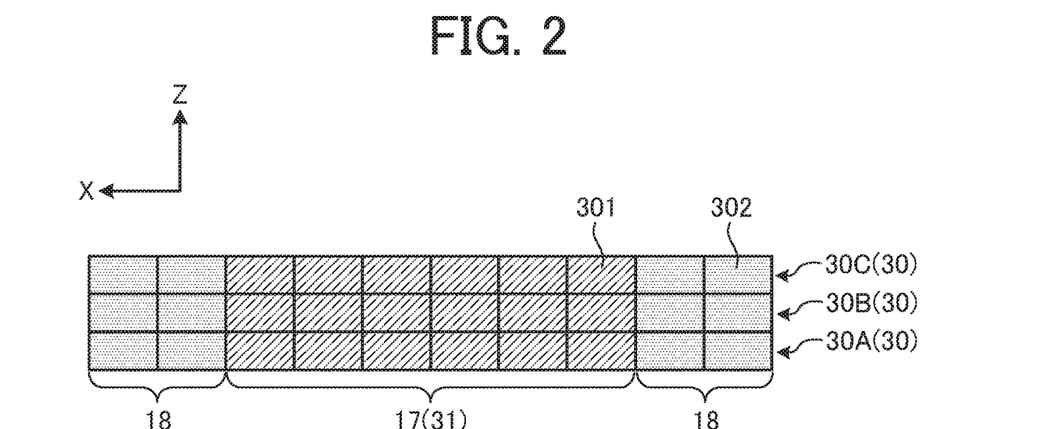
FIG. 2 is a view illustrating an example of a fabrication object.

Next, an outline of fabricating operation performed by the fabricating apparatus 10 will be described. Description will be given with reference to FIGS. 1 and 2. FIG. 2 is a view illustrating an example of the fabrication object 31.

The fabricating apparatus 10 discharges a fabrication material 301 from the first head 11 to a fabricating region while moving the fabricating unit 20 in the X-direction, and discharges a support material 302 from the second head 12 to a support region other than the fabricating region.

Thereafter, the fabrication material 301 and the support material 302 are cured by emission of ultraviolet rays by the UV irradiator 13, so as to form a fabrication layer 30 as one layer including the model portion 17 and the support portion 18.

Repetition of formation of the fabrication layer 30 achieves sequentially stacking and this leads to construction of a stack of a plurality of fabrication layers 30 (fabrication layer 30A to the fabrication layer 30C in FIG. 2, fabrication layer 30A to the fabrication layer 30E in FIG. 1). Thereafter, the support portion 18 is removed from the stack so as to obtain the fabrication object 31.

Figure 3:
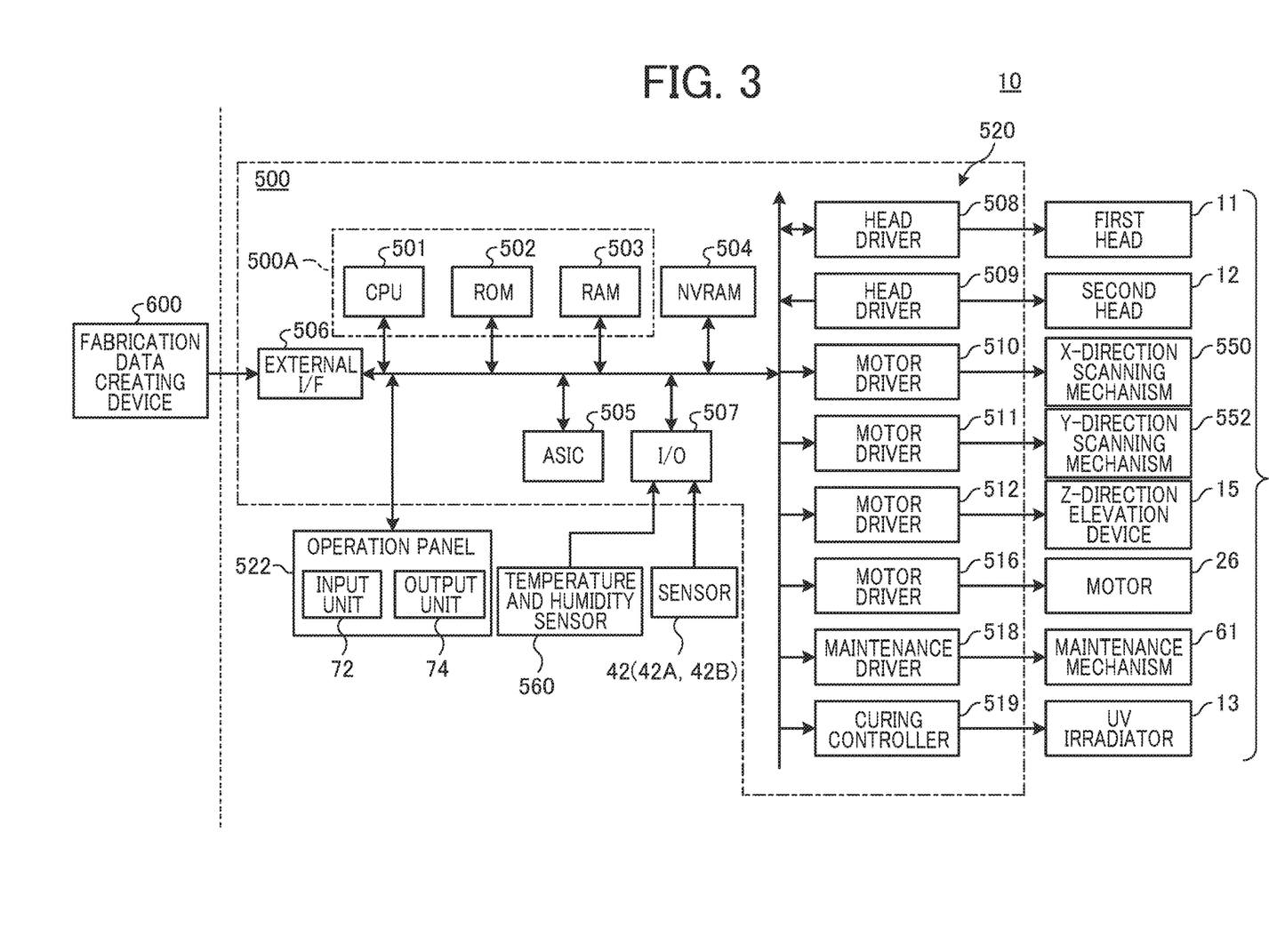
FIG. 3 is a schematic diagram illustrating an example of a hardware configuration of a fabricating apparatus.

Next, a hardware configuration of the fabricating apparatus 10 will be described. FIG. 3 is a schematic diagram illustrating an example of a hardware configuration of the fabricating apparatus 10.

The fabricating apparatus 10 includes a controller 500, an operation panel 522, a temperature and humidity sensor 560, a sensor 42, and a fabricating device 70. The controller 500, the operation panel 522, the temperature and humidity sensor 560, the sensor 42, and the fabricating device 70 are connected to enable exchanging data and signals.

The operation panel 522 receives user's operation instructions and outputs various types of information. The operation panel 522 includes an input unit 72 and an output unit 74. The input unit 72 receives user's operation instructions. Examples of the input unit 72 include a keyboard, a mouse, and a touch panel. The output unit 74 outputs various types of information.

The output unit 74 includes at least one of a display function of displaying various types of information, an audio output function of outputting sound, a vibration output function of outputting vibration, and a communication function of transmitting various types of information to an external device. The present embodiment to be described is an exemplary case where the output unit 74 has a display function of displaying various types of information.

The temperature and humidity sensor 560 is a sensor to detect temperature and humidity, which is an installation environment of the fabricating apparatus 10.

The fabricating device 70 includes a first head 11, a second head 12, an X-direction scanning mechanism 550, a Y-direction scanning mechanism 552, a Z-direction elevation device 15, a motor 26, a maintenance mechanism 61, and a UV irradiator 13.

The X-direction scanning mechanism 550 and the Y-direction scanning mechanism 552 move the fabricating unit 20 in the X-direction and the Y-direction, respectively. The motor 26 rotates a roller of the flattening roller 16. The maintenance mechanism 61 is a known mechanism for performing maintenance of the first head 11 and the second head 12.

The controller 500 controls the fabricating device 70 so as to control fabrication of the fabrication object 31.

The controller 500 includes a main controller 500A, an external interface (I/F) 506, an application specific integrated circuit (ASIC) 505, an input/output (I/O) 507, a nonvolatile random access memory (NVRAM) 504, and a driving controller 520.

The main controller 500A includes a central processing unit (CPU) 501, a read only memory (ROM) 502, and a RAM 503.

The ASIC 505 performs image processing of applying various types of signal processing on the image data and other processing of input/output signals for controlling the entire apparatus. The external I/F 506 obtains fabrication data from the fabrication data creating device 600 and outputs the obtained data to the main controller 500A. The fabrication data is data used for fabricating the fabrication object 31. The fabrication data includes a plurality of pieces of slice data obtained by slicing the fabrication object 31 for each of the fabrication layers 30.

The I/O 507 receives detection results of the temperature and humidity sensor 560 and the sensor 42, and outputs the results to the main controller 500A.

The driving controller 520 includes a head driver 508, a head driver 509, a motor driver 510, a motor driver 511, a motor driver 512, a motor driver 516, a maintenance driver 518, and a curing controller 519.

The head driver 508 drives and controls the driving of the first head 11. The head driver 509 controls the driving of the second head 12. The motor driver 510, the motor driver 511, and the motor driver 512 drive the X-direction scanning mechanism 550, the Y-direction scanning mechanism 552, and the Z-direction elevation device 15, respectively. The motor driver 516 drives the motor 26 of the flattening roller 16. The maintenance driver 518 drives the maintenance mechanism 61. The curing controller 519 controls the UV irradiator 13.

As described above, the controller 500 obtains fabrication data from the fabrication data creating device 600. This fabrication data includes data including additional data of a support region to which a support material is to be applied. Next, the controller 500 controls the driving controller 520 on the basis of the obtained fabrication data. On the basis of fabrication data, the controller 500 may also create data including additional data of the support region to which a support material is to be applied.

The driving controller 520 controls to discharge droplets of the liquid fabrication material 301 from the first head 11 onto the fabricating region and controls to discharge droplets of the liquid support material 302 from the second head 12 onto the support region. Through these controls, the controller 500 control to proceed with fabrication of the fabrication object 31 according to the fabrication data.

Figure 4:
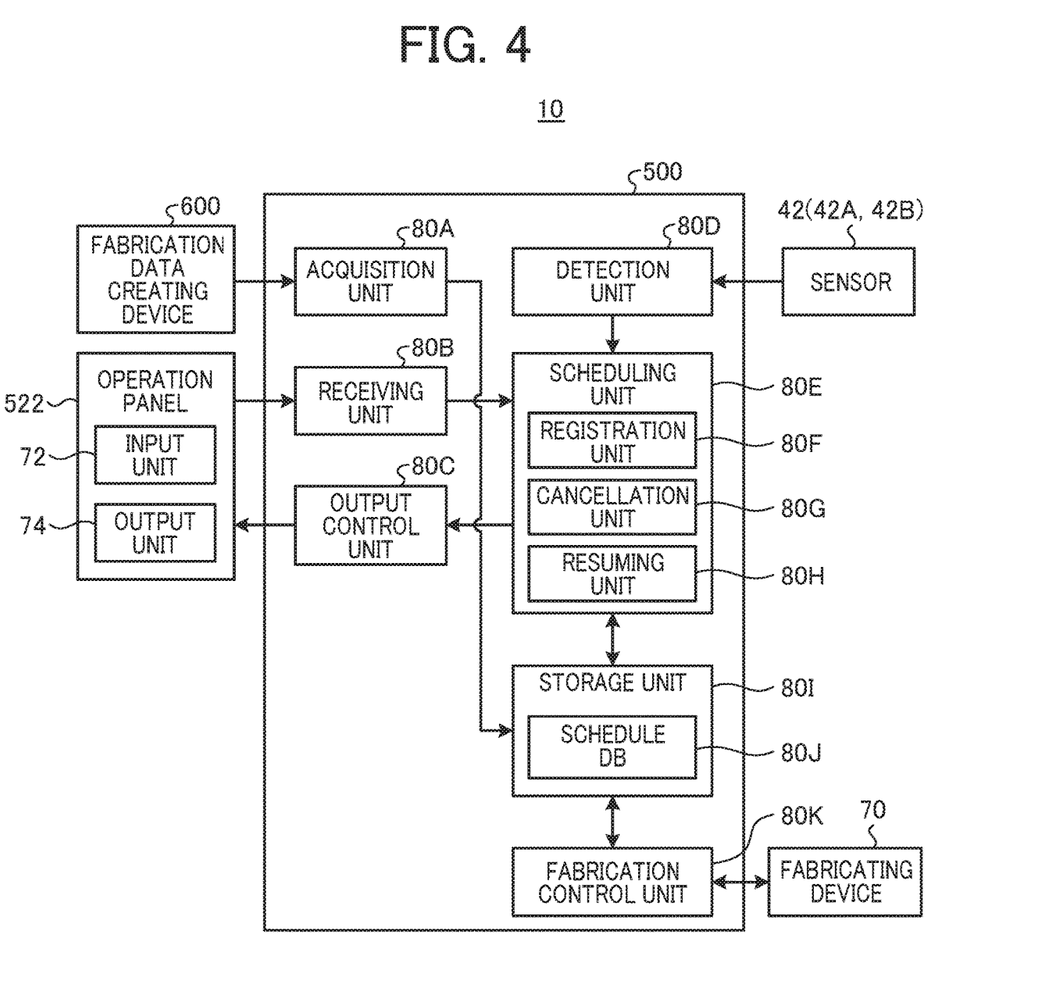
FIG. 4 is a schematic diagram illustrating an example of a functional configuration of a fabricating apparatus.

Next, a functional configuration of the fabricating apparatus 10 will be described. FIG. 4 is a schematic diagram illustrating an example of a functional configuration of the fabricating apparatus 10.

The controller 500 of the fabricating apparatus 10 includes an acquisition unit 80A, a receiving unit 80B, an output control unit 80C, a detection unit 80D, a scheduling unit 80E, a storage unit 80I, and a fabrication control unit 80K. The scheduling unit 80E includes a registration unit 80F, a cancellation unit 80G, and a resuming unit 80H.

The acquisition unit 80A, the receiving unit 80B, the output control unit 80C, the detection unit 80D, the scheduling unit 80E, the registration unit 80F, the cancellation unit 80G, the resuming unit 80H, and the fabrication control unit 80K are implemented by one or more processors. For example, each of the above units may be implemented by causing a processor such as a CPU to execute a program, that is, by software. Each of the above units may be implemented by a processor such as a dedicated integrated circuit (IC), that is, by hardware. Each of the above units may be implemented by using software and hardware in combination. In the case of using a plurality of processors, each of the processors may implement one of each of units, or may implement two or more of the units.

The acquisition unit 80A obtains fabrication data of the fabrication object 31 as a fabrication object. In the present embodiment, the acquisition unit 80A obtains fabrication data from the fabrication data creating device 600. The acquisition unit 80A may obtain fabrication data from an external memory, the NVRAM 504, or the like.

The receiving unit 80B receives various types of information input by user's operation instructions. In the present embodiment, the receiving unit 80B receives various types of information from the input unit 72 of the operation panel 522.

Specifically, the receiving unit 80B receives designation of the scheduled fabrication start time of the fabrication object 31. The scheduled fabrication start time is a scheduled time to start fabrication of the fabrication object 31. The user operates the input unit 72 of the operation panel 522 and thereby inputs a desired scheduled fabrication start time. That is, the input unit 72 outputs the scheduled fabrication start time designated by user's operation input to the receiving unit 80B. The receiving unit 80B receives designation of the scheduled fabrication start time from the input unit 72.

In addition, the receiving unit 80B may receive designation of scheduled fabrication start time and designation of permissibility information. In the present embodiment, a case where the receiving unit 80B receives the designation of the scheduled fabrication start time and the designation of permissibility information will be described.

The permissibility information is information indicating whether to permit forced fabrication start at the scheduled fabrication start time, or not. The forced fabrication start means that the fabricating is forcibly started even when the fabricating apparatus 10 is in a condition that would interfere with the fabricating operation at the scheduled fabrication start time. That is, in a case where the permissibility information indicates permission, it indicates that fabrication start is to be permitted at the scheduled fabrication start time even when it is in a condition that would interfere with fabricating operation of the fabricating apparatus 10. In contrast, in a case where the permissibility information indicates non-permission, it indicates that fabrication is not to be started even when the scheduled fabrication start time arrives in a case where it is in a condition that would interfere with fabricating operation of the fabricating apparatus 10.

The user may perform operation instruction on the input unit 72 so as to perform operation input of permissibility information indicating permission or non-permission. Then, the receiving unit 80B may receive the permissibility information from the input unit 72.

The receiving unit 80B may obtain the scheduled fabrication start time and the permissibility information from the fabrication data creating device 600 via the acquisition unit 80A. In this case, the fabrication data creating device 600 may output the fabrication data and the fabrication start time designated by the user operating the fabrication data creating device 600 and permissibility information to the acquisition unit 80A. For example, the fabrication data creating device 600 uses computer-aided manufacturing (CAM) to generate CAM data including fabrication data, fabrication start time, and permissibility information and then, outputs the generated CAM data to the fabricating apparatus 10. In this case, the receiving unit 80B of the controller 500 may read the fabrication start time and permissibility information included in the CAM data and thereby receive these pieces of data.

The detection unit 80D detects a change in the fabrication practicability condition of the fabricating apparatus 10. The fabrication practicability condition indicates an event that would have an influence on the execution of the fabrication processing by the fabricating apparatus 10. In the present embodiment, the detection unit 80D uses the detection result of the sensor 42 to detect a change in the fabrication practicability condition.

In the present embodiment, the detection unit 80D detects an interfering condition that would interfere with fabricating operation of the fabricating apparatus 10 as a change in the fabrication practicability condition.

Examples of the interfering condition that would interfere with the fabricating operation include a condition in which the cover 40B is open and a condition in which a foreign object is placed on the fabrication stage 14. This is because the condition in which the cover 40B is open indicates a possibility of a foreign object to be placed on the fabrication stage 14.

In this case, when the detection result by the sensor 42A changes from the detection result indicating the condition in which the cover 40B is closed to the detection result indicating the condition in which the cover 40B is open, the detection unit 80D determines this as an interfering condition and detects the change in the fabrication practicability condition.

Furthermore, for example, in a case where the detection result by the sensor 42B indicates a condition in which a foreign object is placed on the fabrication stage 14, the detection unit 80D determines this as an interfering condition and detects a change in the fabrication practicability condition.

Note that when the detection result by the sensor 42A changes from the detection result indicating the condition in which the cover 40B is open to the detection result indicating the condition in which the cover 40B is closed, the detection unit 80D may determine this as the interfering condition and detects the change in the fabrication practicability condition.

The fabrication control unit 80K controls the fabricating device 70 so as to fabricate the fabrication object 31 according to the fabrication data obtained by the acquisition unit 80A. In the present embodiment, the fabrication control unit 80K controls fabrication performed by the fabricating device 70 on the basis of a schedule DB 80J described below.

The scheduling unit 80E schedules a fabrication timing of the fabricating device 70 on the basis of the scheduled fabrication start time received by the acquisition unit 80A. Specifically, the scheduling unit 80E includes a registration unit 80F, a cancellation unit 80G, and a resuming unit 80H.

The registration unit 80F registers the scheduled fabrication start time received by the receiving unit 80B. In the present embodiment, the registration unit 80F registers the scheduled fabrication start time to the schedule DB 80J stored in the storage unit 80I.

Figure 5:
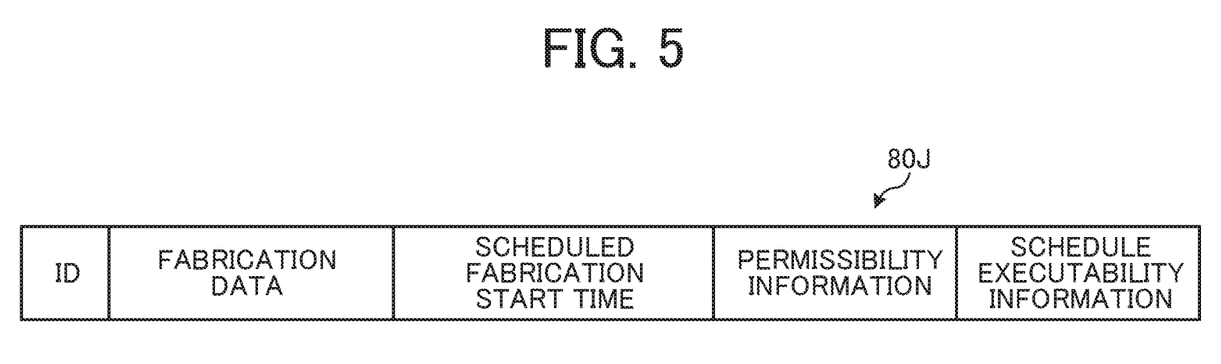
FIG. 5 is a schematic diagram illustrating an example of a data configuration of a schedule database (DB)

The schedule DB 80J is a database used for schedule management. The data format of the schedule DB 80J is not limited to the database. FIG. 5 is a schematic diagram illustrating an example of a data configuration of the schedule DB 80J.

The schedule DB 80J is a database that associates an identification information (ID), fabrication data, scheduled fabrication start time, permissibility information, and schedule executability information with each other.

ID is identification information for identifying fabrication data. The schedule executability information indicates either "execute" to start fabrication at the corresponding scheduled fabrication start time, or "cancel" to cancel execution of fabrication at the scheduled fabrication start time. The schedule executability information indicates "execute" in an initial state.

In a case where the schedule executability information indicated in the schedule DB 80J indicates "execute", the fabrication control unit 80K controls the fabricating device 70 to fabricate the fabrication object 31 indicated by corresponding fabrication data at the corresponding scheduled fabrication start time.

In contrast, in a case where the schedule executability information indicated in the schedule DB 80J indicates "cancel", the fabrication control unit 80K would not execute fabrication control for the fabrication object 31 indicated by the corresponding fabrication data even when the corresponding scheduled fabrication start time arrives.

At each of acquisition of fabrication data, the acquisition unit 80A assigns an ID to the obtained fabrication data and registers the data to the schedule DB 80J.

The registration unit 80F registers the scheduled fabrication start time and permissibility information received by the receiving unit 80B to the schedule DB 80J in association with the fabrication data of the fabrication object 31 as a fabrication object for which fabrication is started at the scheduled fabrication start time.

When the detection unit 80D has detected a change in the fabrication practicability condition, the cancellation unit 80G cancels the start of fabrication at the scheduled fabrication start time registered in the schedule DB 80J. That is, when a change in the fabrication practicability condition is detected by the detection unit 80D, the cancellation unit 80G changes the schedule executability information corresponding to the scheduled fabrication start time registered in the schedule DB 80J from "execute" to "cancel".

Note that the cancellation unit 80G may cancel the fabrication start of the scheduled fabrication start time registered in the schedule DB 80J in a case where a change in the fabrication practicability condition has been detected by the detection unit 80D and the permissibility information indicates non-permission to fabrication start. That is, when a change in the fabrication practicability condition is detected by the detection unit 80D and the permissibility information indicates non-permission of fabrication start, the cancellation unit 80G changes the schedule executability information corresponding to the scheduled fabrication start time registered in the schedule DB 80J from "execute" to "cancel".

In a case where the schedule executability information has been changed to "cancel" by the cancellation unit 80G, the fabrication control unit 80K would not control the fabrication of the fabrication object 31 indicated by the corresponding fabrication data even when the corresponding scheduled fabrication start time arrives.

The schedule executability information that has been changed by the cancellation unit 80G from "execute" to "cancel" is now changed to "execute" by the resuming unit 80H. For example, it is assumed that the scheduling unit 80E recognizes that the receiving unit 80B has received "permission" as permissibility information on the basis of an user's operation instruction from the input unit 72. In this case, the registration unit 80F of the scheduling unit 80E registers permissibility information indicating "permission" to the schedule DB 80J, while the resuming unit 80H changes the corresponding schedule executability information to "execute".

This processing brings the fabrication control unit 80K to a state capable of starting controlling the fabrication of the fabrication object 31 indicated by the corresponding fabrication data when the corresponding scheduled fabrication start time arrives. That is, the fabrication control unit 80K turns to a condition capable of resuming the fabrication processing. Therefore, for example, it is assumed that the receiving unit 80B has received permissibility information indicating "permission" by the user's operation instruction on the input unit 72 before arrival of the scheduled fabrication start time. This would lead to resumption of a schedule of starting fabrication at a scheduled fabrication start time registered in the schedule DB 80J.

In addition, in a case where the schedule executability information has been changed to "cancel" by the cancellation unit 80G and the receiving unit 80B has not received permissibility information indicating "permission" before arrival of the scheduled fabrication start time, the fabrication control unit 80K would not control the fabrication of the fabrication object 31 indicated by the corresponding fabrication data even when the corresponding scheduled fabrication start time arrives.

The output control unit 80C outputs change information from the output unit 74 when a change in the fabrication practicability condition is detected after the reception of the designation of the scheduled fabrication start time.

The change information is information indicating that a change has occurred in the fabrication practicability condition of the fabricating apparatus 10. In a case where the detection unit 80D has detected an interfering condition that would interfere with fabricating operation as a change in the fabrication practicability condition, the change information may be information indicating the interfering condition.

The user can confirm the change information output from the output unit 74 so as to be able to confirm that the fabrication practicability condition of the fabricating apparatus 10 has changed.

The output control unit 80C may output the change information in a case where a change in the fabrication practicability condition is detected after the reception of the designation of scheduled fabrication start time and the permissibility information indicates non-permission to forced fabrication start.

Meanwhile, the output control unit 80C may output the change information to an external device such as a personal computer having an installed management tool (for example, a known Web image monitor) used for monitoring and configuration of the fabricating apparatus 10 using a Web browser. Alternatively, the management tool may be installed on the operation panel 522 and change information may be output to a screen of the management tool on the operation panel 522. Note that it would be also allowable to display information provided by the controller 500 by using a browser and perform management on the basis of the information rather than installing the management tool in an external device such as a personal computer.

The receiving unit 80B may receive designation of scheduled fabrication start time of each of the plurality of fabrication objects 31. In this case, the acquisition unit 80A may obtain fabrication data of each of the plurality of fabrication objects 31, assign IDs to each of the pieces of fabrication data, and register the data to the schedule DB 80J. Meanwhile, the scheduling unit 80E may register the scheduled fabrication start time and permissibility information received by the receiving unit 80B to the schedule DB 80J in association with the corresponding fabrication data.

Figure 6:
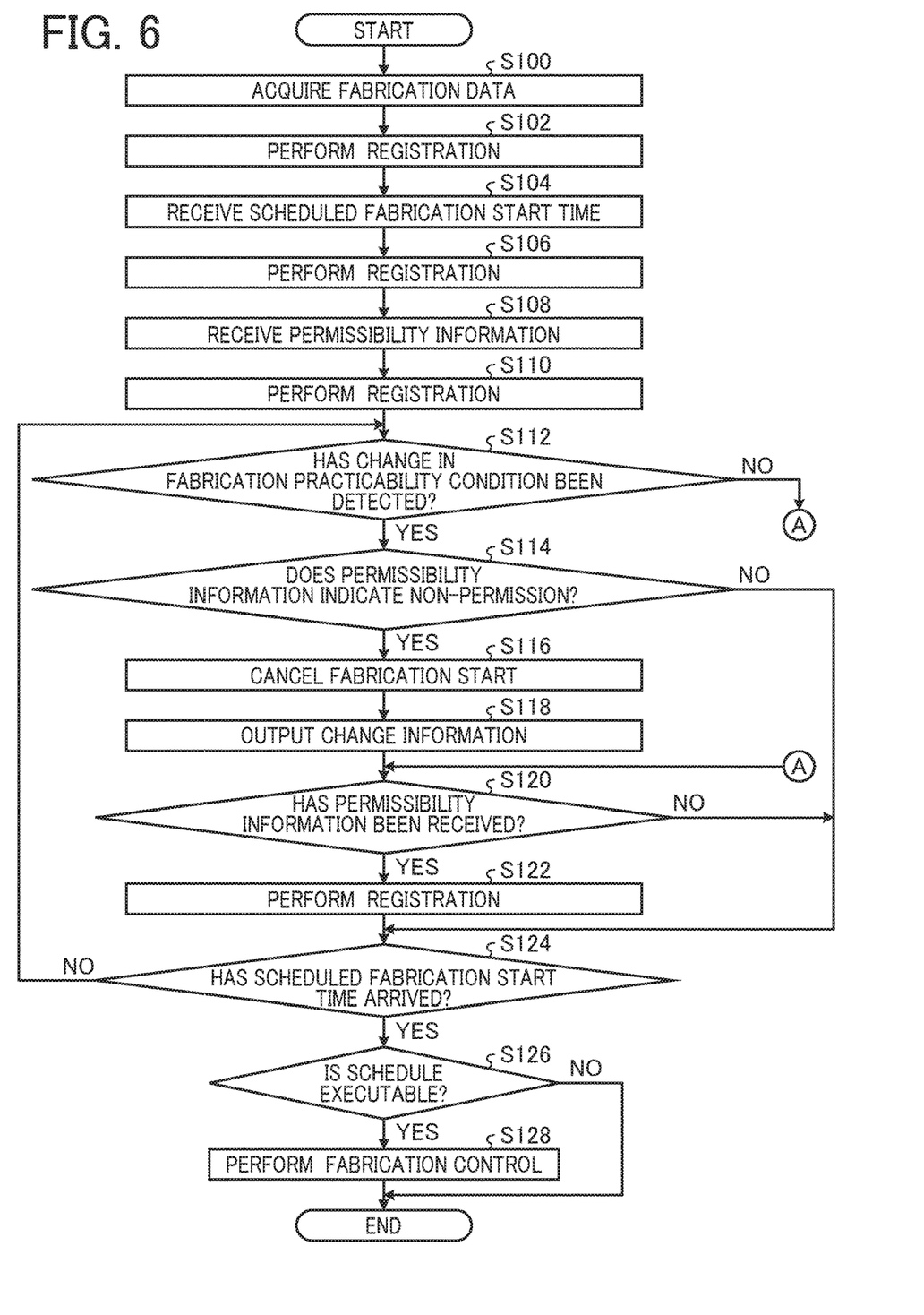
FIG. 6 is a flowchart illustrating an example of a procedure of fabrication processing.

Next, a procedure of the fabrication processing executed by the fabricating apparatus 10 according to the present embodiment will be described. FIG. 6 is a flowchart illustrating an example of a procedure of the fabrication processing executed by the fabricating apparatus 10 according to the present embodiment. In FIG. 6, a procedure in a case where one piece of fabrication data is registered to the schedule DB 80J will be described as an example.

First, the acquisition unit 80A obtains fabrication data (step S100). The acquisition unit 80A assigns an ID to the obtained fabrication data and registers the data to the schedule DB 80J (step S102).

Next, the receiving unit 80B receives (step S104) from the input unit 72 the scheduled fabrication start time of the fabrication data obtained in step S100. The registration unit 80F of the scheduling unit 80E registers (step S106) the scheduled fabrication start time received in step S104 to the schedule DB 80J in association with the fabrication data obtained in step S100.

Next, the receiving unit 80B receives permissibility information from the input unit 72 (step S108). With the processing of step S108, the fabricating apparatus 10 allows the user to designate whether it is allowable to start fabrication at the designated scheduled fabrication start time with no problem.

The registration unit 80F of the scheduling unit 80E registers (step S110) the permissibility information received in step S108 to the schedule DB 80J in association with the fabrication data obtained in step S100.

Next, it is determined whether the detection unit 80D has detected a change in the fabrication practicability condition on the basis of the detection result received from the sensor 42 (step S112). In a case where no change in the fabrication practicability condition has been detected (step S112: No), the processing proceeds to step S120 described below.

In a case where a change in the fabrication practicability condition has been detected (step S112: Yes), the processing proceeds to step S114. In step S114, the cancellation unit 80G determines whether the permissibility information registered in the schedule DB 80J indicates non-permission (step S114). When the information indicates permission (step S114: No), the processing proceeds to step S124 to be described below. When the information indicates non-permission (step S114: Yes), the processing proceeds to step S116.

In step S116, the cancellation unit 80G changes "execute" registered in the schedule executability information of the schedule DB 80J to "cancel" to cancel the fabrication start (step S116).

Next, the output control unit 80C outputs the change information detected in step S112 from the output unit 74 (step S118).

Next, it is determined whether the receiving unit 80B has received permissibility information from the input unit 72 (step S120). In a case where the permissibility information has not been received within a predetermined time (step S120: No), the processing proceeds to step S124 to be described below. In contrast, in a case where the permissibility information has been received (step S120: Yes), the processing proceeds to step S122.

In step S122, the permissibility information received in step S122 is registered (step S122) to the schedule DB 80J in association with the fabrication data obtained in step S100.

Next, the fabrication control unit 80K determines whether the scheduled fabrication start time registered in the schedule DB 80J has arrived (step S124). In a case where the scheduled fabrication start time has not arrived (step S124: No), the processing returns to step S112. In contrast, in a case where the scheduled fabrication start time has arrived (step S124: Yes), the processing proceeds to step S126.

In step S126, the fabrication control unit 80K determines whether the schedule is executable (step S126). The fabrication control unit 80K determines whether the schedule executability information in the schedule DB 80J indicates "execute", thereby making the determination of step S126. In a case where a negative determination is made in step S126 (step S126: No), the present routine is finished. In contrast, in a case where an affirmative determination is made in step S126 (step S126: Yes), the processing proceeds to step S128. In step S128, the fabrication control unit 80K controls the fabricating device 70 to fabricate the fabrication object 31 by using the fabrication data corresponding to the scheduled fabrication start time determined in step S124 registered in the schedule DB 80J (step S128). This completes the present routine.

In a case where the permissibility information indicating "permission" is received by the receiving unit 80B after passing the scheduled fabrication start time (step S124: Yes), the fabrication control unit 80K may perform fabrication control of the fabrication object 31 at the reception of the permissibility information (step S128).

It is also possible to perform control, in the fabricating apparatus 10, so as not to receive acquisition of new fabrication data in a period (steps S100 to S128) that is, after acquisition of one piece of fabrication data in step S100 until execution of fabrication at the scheduled fabrication start time for which designation has been received in step S104 for the corresponding fabrication data.

As described above, the fabricating apparatus 10 of the present embodiment is a fabricating apparatus for the fabrication object 31. The fabricating apparatus 10 includes the receiving unit 80B, the detection unit 80D, and the output control unit 80C. The receiving unit 80B receives designation of the scheduled fabrication start time for the fabrication object 31. The detection unit 80D detects a change in the fabrication practicability condition of the fabricating apparatus 10. The output control unit 80C outputs change information indicating that a change has occurred in the fabrication practicability condition of the fabricating apparatus 10 when a change in the fabrication practicability condition is detected after the reception of the designation of the scheduled fabrication start time.

In this manner, the fabricating apparatus 10 according to the present embodiment outputs change information indicating that a change has occurred in the fabrication practicability condition of the fabricating apparatus 10 when a change in the fabrication practicability condition is detected after the reception of the designation of the scheduled fabrication start time.

Therefore, in a case where an apparatus condition has changed after reservation of the scheduled fabrication start time, it is possible to present to the user that a change in the fabrication practicability condition has occurred. That is, it is possible to provide the user with information related to the change of scheduled fabrication start time, information prompting confirmation of the condition of the fabricating apparatus 10, or the like.

Accordingly, in the fabricating apparatus 10 according to the present embodiment, it is possible to suppress continuation of setting the apparatus in a non-operating condition until the scheduled fabrication start time arrives, or possible to suppress a forced start of the fabrication processing at the scheduled fabrication start time even in a case where it is in a condition that would interfere with the fabrication, or in a case where the fabrication enabled condition is obtained before arrival of the scheduled fabrication start time.

Therefore, the fabricating apparatus 10 according to the present embodiment is capable of suppressing a reduction in fabrication efficiency.

Furthermore, the fabricating apparatus 10 according to the present embodiment is capable of suppressing continuation of setting the apparatus in a non-operating condition until the scheduled fabrication start time arrives regardless of the change in the fabrication practicability condition of the fabricating apparatus 10. Accordingly, in addition to the above effects of the fabricating apparatus 10 of the present embodiment, it is possible to effectively use the fabricating apparatus 10. Further, since the fabricating apparatus 10 of the present embodiment can provide change information to the user, it is possible to suppress that the fabricating apparatus 10 is in a state of causing interference in fabricating at the scheduled fabrication start time.

Additionally, the detection unit 80D detects an interfering condition that would interfere with the fabricating operation of the fabricating apparatus 10 as a change in the fabrication practicability condition.

The receiving unit 80B receives the designation of the scheduled fabrication start time and the designation of permissibility information indicating permission or non-permission of forced fabrication start at the scheduled fabrication start time.

The output control unit 80C outputs the change information in a case where a change in the fabrication practicability condition is detected after the reception of the designation of scheduled fabrication start time and the permissibility information indicates non-permission to forced fabrication start.

The registration unit 80F registers the received scheduled fabrication start time. The cancellation unit 80G cancels the fabrication start at the registered scheduled fabrication start time when the change in the fabrication practicability condition is detected.

In a case where the permissibility information indicates non-permission of the fabrication start, the cancellation unit 80G cancels the start of fabricating at the registered scheduled fabrication start time.

The receiving unit 80B receives designation of the scheduled fabrication start time of each of the plurality of fabrication objects 31.

A fabricating method according to the present embodiment is a fabricating method using the fabricating apparatus 10 of the fabrication object 31, and the method includes: a step of receiving designation of a scheduled fabrication start time of the fabrication object 31; a step of detecting a change in a fabrication practicability condition of the fabricating apparatus 10; and a step of outputting change information indicating that a change has occurred in the fabrication practicability condition of the fabricating apparatus 10 when the change in the fabrication practicability condition has been detected after the reception of the designation of the scheduled fabrication start time.

A program according to the present embodiment is a program for causing a computer connected to the fabricating apparatus 10 of the fabrication object 31 to execute: a step of receiving designation of a scheduled fabrication start time of the fabrication object 31; a step of detecting a change in a fabrication practicability condition of the fabricating apparatus 10; and a step of outputting change information indicating that a change has occurred in the fabrication practicability condition of the fabricating apparatus 10 when the change in the fabrication practicability condition has been detected after reception of designation of the scheduled fabrication start time.

Note that the program for executing the above-described processing to be executed by the fabricating apparatus 10 in the above-described embodiment may be provided as a file in an installable format or an executable format, recording in a computer readable recording medium such as a compact disc (CD)-ROM, a flexible disk (FD), a CD-R, a digital versatile disk (DVD), and a universal serial bus (USB) memory, or may be provided or distributed via a network such as the Internet. It is also allowable to incorporate various programs in a ROM or the like in advance and provide the programs.

The program to be executed on the fabricating apparatus 10 in the above-described embodiment has a module configuration including each of the above-described functional units. In view of an actual hardware configuration, for example, the CPU 501 reads and executes a program in the ROM 502, so as to load the above-described functional units onto the RAM 503, and then the individual functional units described above are generated on the RAM 503. It is also possible to implement a part or all of the functions of the fabricating apparatus 10 by using dedicated hardware such as the ASIC 505 or a Field-Programmable Gate Array (FPGA).

The embodiment described above has been presented as an example, and it is not intended to limit the scope of the invention. The above-described novel embodiments and their modifications can be implemented in various other modes, and it is possible to make various omissions, substitutions, and changes without departing from the scope and spirit of the invention. The above embodiments are included in the scope and the spirit of the invention, while being included in the invention described in the claims and the equivalent scope thereof.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A fabricating apparatus comprising processing circuitry configured to:
receive designation of a scheduled fabrication start time of a fabrication object;
receive permissibility information indicating whether to permit forced fabrication start at the scheduled fabrication start time even when the fabricating apparatus is in a condition that would interfere with a fabricating operation at the scheduled fabrication start time;
register the received scheduled fabrication start time and the received permissibility information in association with corresponding fabrication data of the fabrication object;
detect a change in a fabrication practicability condition of the fabricating apparatus; and
output change information indicating an occurrence of a change in the fabrication practicability condition of the fabricating apparatus when the change in the fabrication practicability condition has been detected after reception of the designation of the scheduled fabrication start time, wherein based on the received permissibility information, the processing circuitry permits a start of fabrication in a condition that interferes with fabricating operation of the fabricating apparatus in a case where the permissibility information indicates the permission at the scheduled fabrication start time, and
the processing circuitry does not permit the start of fabrication in the condition that interferes with the fabricating operation of the fabricating apparatus in a case where the permissibility information indicates a non-permission at the scheduled fabrication start time.

2. The fabricating apparatus according to claim 1, wherein the processing circuitry detects an interfering condition that interferes with fabricating operation of the fabricating apparatus as a change in the fabrication practicability condition.

3. The fabricating apparatus according to claim 1, wherein
the processing circuitry outputs the change information in a case where the change in the fabrication practicability condition is detected after reception of the designation of the scheduled fabrication start time and the permissibility information indicates non-permission of the forced fabrication start.

4. The fabricating apparatus according to claim 3, wherein the processing circuitry
cancels a start of fabrication at the scheduled fabrication start time registered, when the change in the fabrication practicability condition is detected.

5. The fabricating apparatus according to claim 4, wherein the processing circuitry cancels the start of fabrication at the scheduled fabrication start time registered, in a case where the permissibility information indicates non-permission of the start of fabrication.

6. The fabricating apparatus according to claim 1, wherein the processing circuitry receives designation of the scheduled fabrication start time of each of a plurality of fabrication objects including the fabrication object.

7. A method for fabricating a fabrication object on a fabricating apparatus, the method comprising:
receiving designation of a scheduled fabrication start time of the fabrication object;
receiving permissibility information indicating whether to permit forced fabrication start at the scheduled fabrication start time even when the fabricating apparatus is in a condition that would interfere with a fabricating operation at the scheduled fabrication start time;
registering the received scheduled fabrication start time and the received permissibility information in association with corresponding fabrication data of the fabrication object;
detecting a change in a fabrication practicability condition of the fabricating apparatus; and
outputting change information indicating an occurrence of a change in the fabrication practicability condition of the fabricating apparatus when the change in the fabrication practicability condition has been detected after reception of the designation of the scheduled fabrication start time, wherein based on permissibility information indicating permission or non-permission to forced fabrication start at the scheduled fabrication start time, permitting a start of fabrication in a condition that interferes with fabricating operation of the fabricating apparatus in a case where the permissibility information indicates the permission at the scheduled fabrication start time, and not permitting the start of fabrication in the condition that interferes with the fabricating operation of the fabricating apparatus in a case where the permissibility information indicates the non-permission at the scheduled fabrication start time.

8. A non-transitory recording medium storing a plurality of instructions which, when executed by one or more processors, causes the processors to execute a method, the method comprising:

receiving designation of a scheduled fabrication start time of a fabrication object by a fabricating apparatus;

receiving permissibility information indicating whether to permit forced fabrication start at the scheduled fabrication start time even when the fabricating apparatus is in a condition that would interfere with a fabricating operation at the scheduled fabrication start time;

registering the received scheduled fabrication start time and the received permissibility information in association with corresponding fabrication data of the fabrication object;

detecting a change in a fabrication practicability condition of the fabricating apparatus; and outputting change information indicating an occurrence of a change in the fabrication practicability condition of the fabricating apparatus when the change in the fabrication practicability condition has been detected after reception of the designation of the scheduled fabrication start time, wherein based on permissibility information indicating permission or non-permission to forced fabrication start at the scheduled fabrication start time, permitting a start of fabrication in a condition that interferes with fabricating operation of the fabricating apparatus in a case where the permissibility information indicates the permission at the scheduled fabrication start time, and not permitting the start of fabrication in the condition that interferes with the fabricating operation of the fabricating apparatus in a case where the permissibility information indicates the non-permission at the scheduled fabrication start time.

* * * * *